Oct. 7, 1941.   M. A. WECKERLY   2,258,081
WEIGHING SCALE
Filed April 3, 1930   3 Sheets-Sheet 3
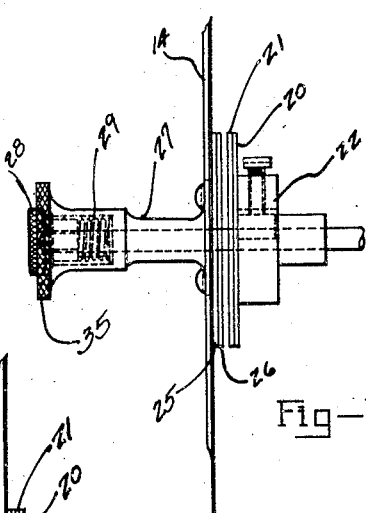
Fig-VI
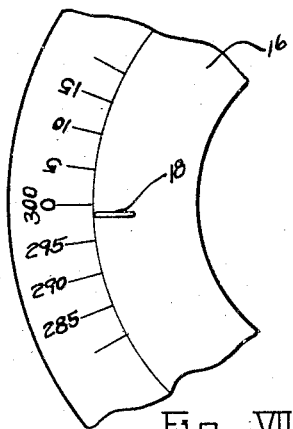
Fig-VII
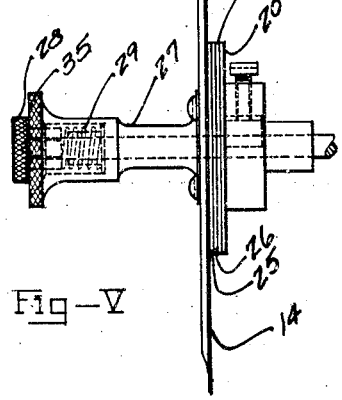
Fig-V
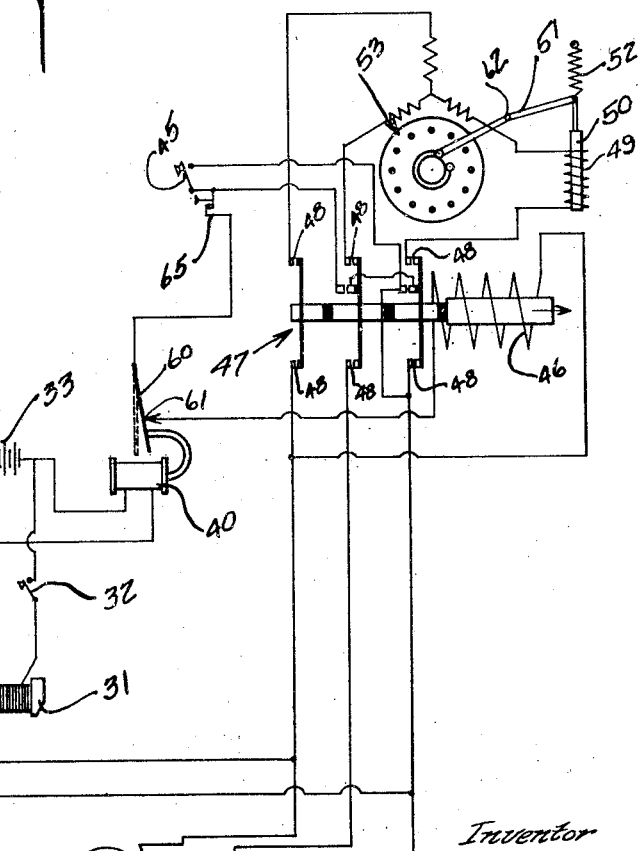
Fig-VIII
Inventor
Mark A. Weckerly
BY CO Marshall
ATTORNEY Patented Oct. 7, 1941

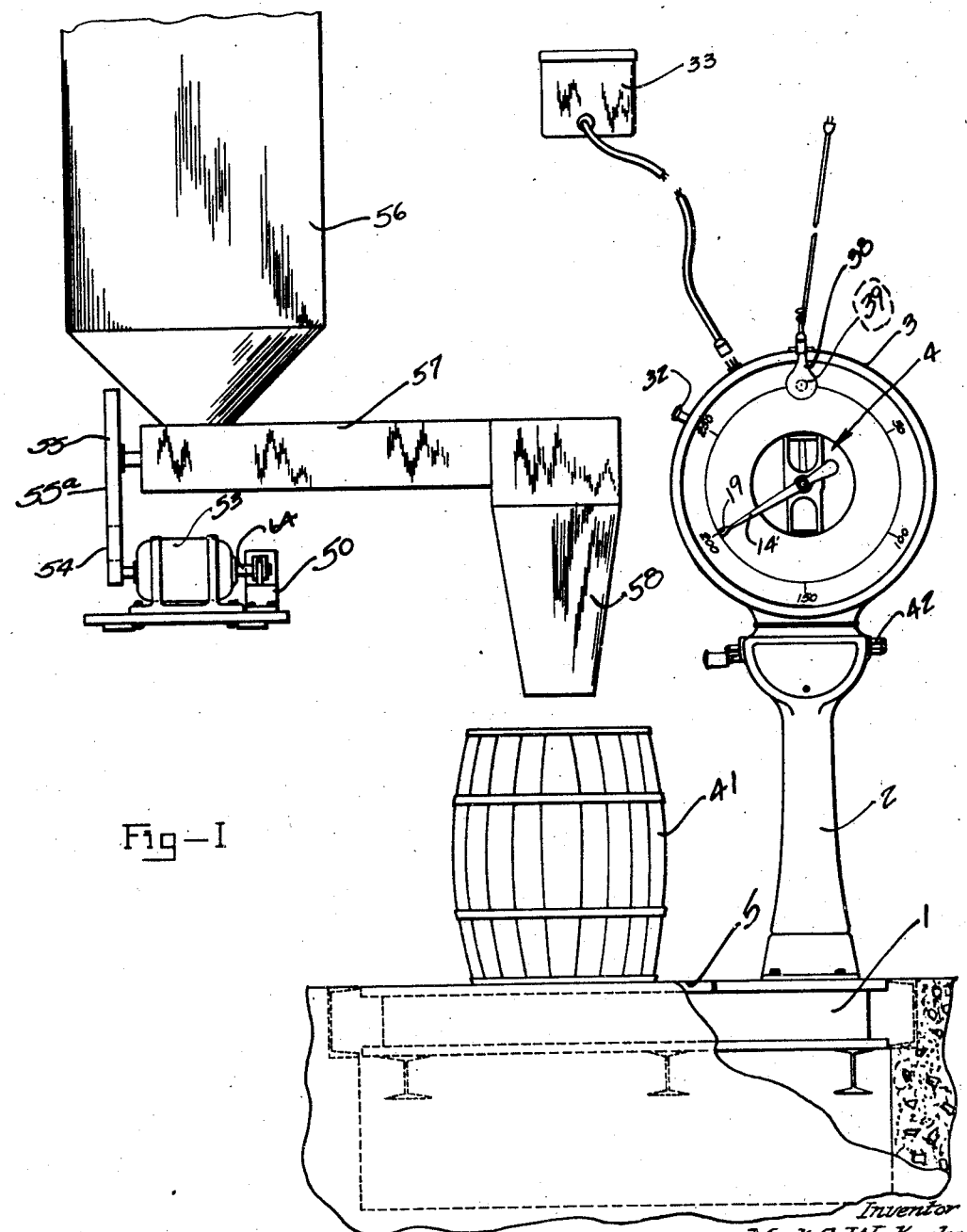

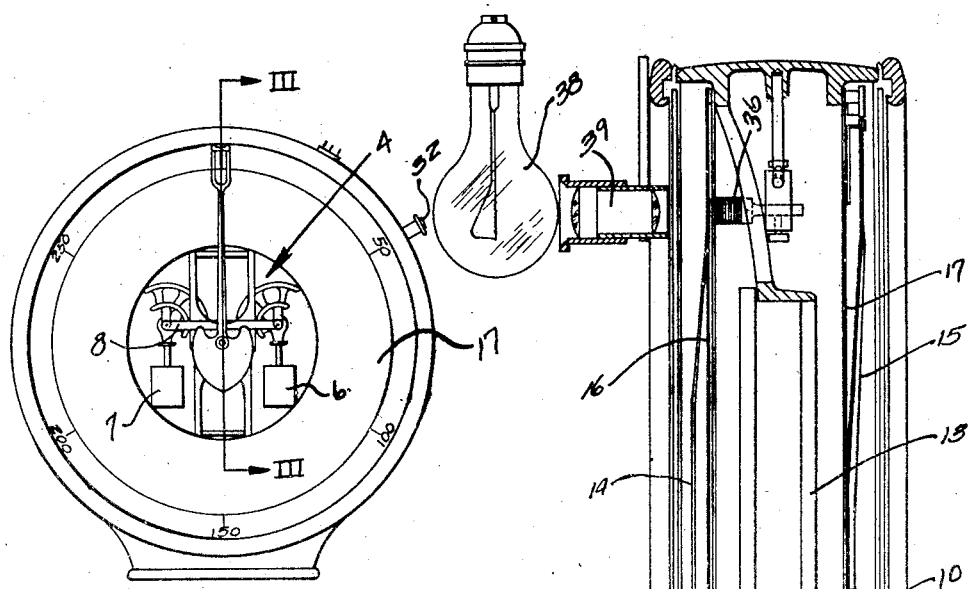
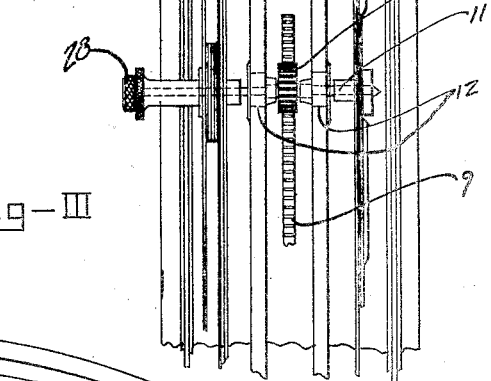
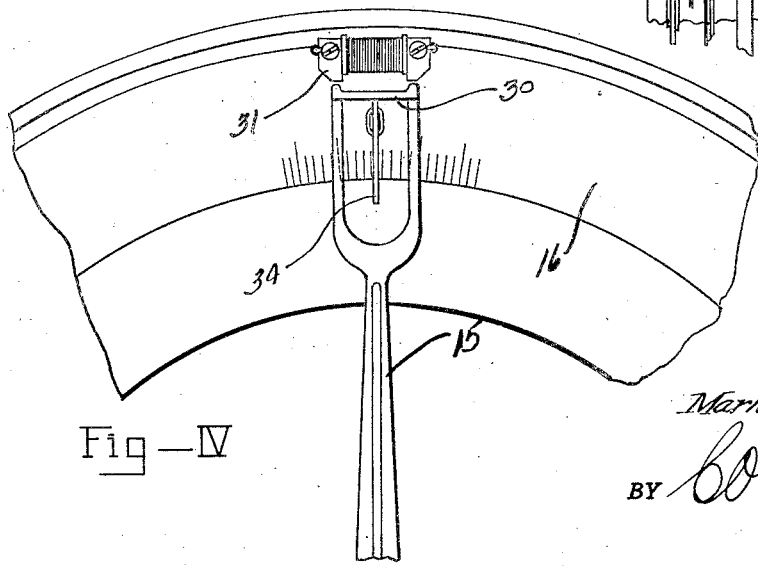

2,258,081

UNITED STATES PATENT OFFICE 2,258,081

WEIGHING SCALE

Mark A. Weckerly, Toledo, Ohio, assignor to Toledo Scale Company, Toledo, Ohio, a corporation of New Jersey Application April 3, 1930, Serial No. 441,385

2 Claims. (Cl. 249—62)

This invention relates to weighing scales and in particular to weighing scales which are adapted to control the action of devices to supply or adjust materials to be weighed on the scales.

The principal object of this invention is the provision of means whereby a weighing scale may control material adjusting devices without reactive interference with the operation of the weighing mechanism.

Another object of the invention is a light operated means, actuated by the weighing scale and adapted to control material feeding or adjusting mechanism.

Another object of this invention is the provision of a frictionless means controlled by scales for controlling electrical circuits which control material feeding or adjusting means, by scales of the type described.

Another object is the provision of means for controlling such circuits by means of a light sensitive cell.

A still further object is the provision of adjustable means whereby electrical circuits controlled by weighing scales may be opened or closed at any point within the weighing capacities of the scales.

A still further object of this invention is the provision of means for giving an ocular indication of the loads deposited on scales by mechanism controlled by the weighing mechanism, so that the operation of the controlling means may be checked.

A still further object of the invention is the provision of means whereby a scale indicator may be manually set to a predetermined point on the chart, corresponding to the desired weight of a load, and to indicate at all times the amount deficient of this desired weight and to co-operate with other means in stopping the feed stream when the desired amount has been deposited on the load receiver.

These and other objects and advantages will be apparent from the following description in which reference is had to the accompanying drawings and wherein similar reference numerals designate similar parts throughout the several views.

In the drawings:

Figure I is a front elevational view of a weighing scale of the type described, a portion of its foundation being broken away.

Figure II is a front elevational view, slightly enlarged, of the scale casing containing the counterbalancing mechanism.

Figure III is an enlarged fragmentary view substantially along the line III—III of Figure II.

Figure IV is an enlarged fragmentary view of the indicating hand in the zero position and of the magnetic means whereby the hand is held stationary in this position.

Figure V is an enlarged fragmentary view of the adjustable indicator clutch mechanism in the connecting position.

Figure VI is an enlarged fragmentary view of said clutch mechanism in the released or opened position.

Figure VII is an enlarged fragmentary view of the dial showing the light entrance slot; and Figure VIII is a diagram showing the electrical circuits.

Referring to the drawings in detail my invention is shown incorporated in a scale which is fully described and illustrated in United States Patent No. 1,543,768 to Hem. For this reason I will not explain it in greater detail than is necessary to fully describe my invention.

Mounted on a base 1 is an upwardly extending column 2 which in turn supports a substantially watch-case-shaped casing 3 in which the counterbalancing mechanism 4 is suitably mounted. A platform 5 rests with suitable bearings on the pivots of the platform levers (not shown) which are suitably located and supported in the base 1. These levers are by suitable mechanism operatively connected to the load counterbalancing mechanism 4.

When a load is placed on the platform 5, the force exerted is transmitted by the levers and the intermediate mechanism (not shown) to the load counterbalancing mechanism 4. Pendulums 6 and 7 swing outwardly and upwardly, their weight moment offsetting the force exerted by the load. A compensating bar 8 operatively connects the two pendulums 6 and 7 and a depending rack 9 is pivotally secured midway between the connections of the compensating bars to the pendulum. The teeth of the rack 9 engage the teeth of a pinion 10 which is mounted on a shaft 11 resting in anti-friction bearings 12 stationed in a bracket 13 within the housing 3. The reciprocating motion of the counterbalancing mechanism 4 is thus translated into rotation. The indicating hands 14 and 15 are also secured to the ends of the shaft 11. As the movement of the counterbalancing mechanism 4 is proportional to the weight of the load on the platform, the angle traversed by the indicator is also proportional to the load, which may thus be employed to indicate the weights of loads.

Secured to the housing 3 immediately behind the indicating hands 14 and 15, are two indicia bearing charts 16 and 17. The designating numerals of the graduations on both of these charts, are disposed thereon in clockwise sequence. A narrow slot 18 is machined in the chart 16 in proximity to the zero graduation, in such a position that the opening is entirely covered when the index line 19, ruled on the spade-like portion of the indicating hand 14, registers with the zero line on the chart. The indicating hand 14 is rotatably mounted on the shaft 11 in such a manner that upon the release of a clutch, its position, with reference to an imaginary line running through the zero graduation on the chart and the indicator shaft, may be readily changed. The clutch plate 20, which is faced with leather or other material 21 having a high co-efficient of friction, is provided with a hub 22 which is pinned or otherwise securely fastened to the shaft 11. The indicating hand 14 is positioned on the portion of the shaft 11 and is also provided with a clutch plate 25 having a facing 26 and, a finger grip 27 which extends outwardly and fits snugly on the extending portion of the shaft 11 being retained there by the nut 28. A compression coil 29 is interposed between the nut 28 and the finger grip. This compression coil urges the hand towards the clutch plate 20. The clutch plate 25 which is fastened to the indicating hand 14 thus securely grips the clutch plate 20, and the indicating hand partakes the same angular movement as the hand 15 which is pinned to the indicating shaft 11. The clutch construction described permits the indicating hand 14 to be set in any position regardless of the position of the hand 15. To insure that the angle, thus formed by the two indicating hands and which represents an increment of weight, can be accurately established, the tip of the indicating hand 15 has an armature 30 secured to it, for co-operation with an electro-magnet 31, which is substantially of the horse shoe type. The electro-magnet 31 is in series with a push button 32 and an energy source 33. When it is desired to set back the indicating hand 14 from its position, pressure on the push button 32, when the scale is in an unloaded condition, will cause the electro-magnet 31 to be energized and the flux set up will hold the indicator 15 rigidly, with the index 34 on the zero graduation. The operator now places the index and second finger in back of the knurled portion 35 of the finger grip 27 and pressing with his thumb on the nut 28, disengages the clutch by drawing the hand 14 forward. The indicating hand may now be rotated through any desired angle and set to the proper graduation. When the fingers are removed from the grip 27 the clutch grips and holds the indicating hand stationary on the shaft 11. The pressure on the push button 32 is then released. This breaks the energizing circuit of the electro-magnet 31 and the indicating shaft 11, with the thereto attached parts, is free to revolve.

Immediately behind the slot 18, located in the chart 16, and placed so that a beam of light, passing through the slot, must strike its surface, is a light sensitive or photo-electric cell 36. A reflector 37 is designed to concentrate all the light passing through the slot 18 on the sensitive surface and to shade it from the exposure to any other light rays, except those which pass through the slot. An incandescent light bulb 38 is preferably stationed so that its rays, which pass through a condensing lens system 39, strike the light sensitive surface of the cell 36. It is well known that cells of this type have the characteristic that the resistance to an electric current decreases in proportion to the amount of light which strikes on the light sensitive surface.

I have placed a cell 36, of this type, in series with an electrical current source 33, which in the embodiment of the present invention is a battery of dry cells, although other sources of energy may be utilized. As it is impossible with light sensitive cells to handle an electric current having a sufficient value to operate a motor, a secondary circuit is controlled by a relay 40 which is operated by the primary circuit. The relay 40 consists of an electro-magnet which is energized by a current from the source 33 when the primary circuit is completed. This takes place when a beam of light of sufficient intensity strikes the sensitive surface of the cell 36 thus lowering its resistance.

Assuming that the scale embodying my invention is employed to control the feed stream in a flour packaging installation, as illustrated by Figure I, and it is desired to pack 200 lbs. into barrels, the weight of the barrel 41 on the platform 5 of the scale is counterbalanced by a poise (not shown) on the beam 42. The indicator 15, which is now pointing directly at the zero character on the chart, is temporarily locked in this position by pressing the push button 32, as has been hereinbefore described and the indicator 14 is set back to the 200 lb. mark by the operation which also has been previously explained. When the push button switch 45 is pressed, the secondary or power circuit is closed. This energizes the solenoid coil 46 of the magnetic switch 47 closing the contacts 48, which remain closed until the circuit is broken. The motor circuit is now completed. The motor brake solenoid 49 is also energized and its armature 50 is drawn downwardly, against the urge of the brake locking spring 52. The motor brake is thus released and the motor 53 revolves actuating a screw conveyor (not shown) within the duct 57, with which it is operatively connected by means of the pinion 54, the gear 55 and the chain 55a. Flour in the hopper 56 is conveyed by the screw in the duct 57 to the funnel 58, from whence it falls, by gravity, into the barrel 41 standing on the platform 5.

As the flour is gradually piling up in the barrel 41, the indicating hand 15 is constantly indicating the increasing amount in the barrel, on the chart 17, while the indicating hand 14 is slowly approaching the zero character on the chart 16. When the required amount is reached, the spade-shaped portion 19 of the indicator 14 completely covers the slot 18, adjacent to the zero character on the chart 16. Light is thus effectively prevented from striking the sensitive surface of the coil 36. The resistance of the cell increases to such a degree that the circuit is broken, the relay 40 accordingly is de-energized, the contact member 60 assumes the position shown by the dotted lines in Figure VIII, and opens the circuit at 61. This de-energizes the solenoid 46. The armature is urged in the direction of the arrow, breaking the contacts 48 and thus de-energizing the motor 53. The lever 51 which is fulcrumed at 62, is drawn upwardly by the spring 52, tightening the clutch of the brake band 63 on the motor shaft 64, thus instantaneously stopping the motor and the feed stream of flour.

As it is sometimes necessary to stop the feed stream, for example, when a broken or defective barrel has inadvertently been placed on the platform 5, a push button switch 65 has been provided in the circuit for manual operation.

The embodiment of my invention herein shown and described is to be regarded as illustrative only, and it is to be understood that the invention is susceptible to variation, modification and change within the spirit and scope of the subjoined claims.

Having described my invention, I claim:

1. A weighing scale adapted to control auxiliary mechanisms, said scale comprising, in combination, a load receiver, load counterbalancing and indicating mechanisms, means connecting said load receiver to said load counterbalancing and indicating mechanisms, controlling mechanism adapted to be actuated by the weight of a load on said load receiver, said indicating and controlling mechanisms each including an indicia bearing chart and an indicator adapted to co-operate therewith, and means connecting said indicators for simultaneous movement, the indicator co-operating with the chart of said controlling mechanism being adapted to be manually set to an indicium on said chart representing the desired weight of a load to be deposited on said load receiver.

2. A weighing scale adapted to control auxiliary mechanisms, said scale comprising, in combination, a load receiver, load counterbalancing and indicating mechanisms, means connecting said load receiver to said load counterbalancing and indicating mechanisms, controlling mechanism including an electrical circuit, said indicating and controlling mechanisms each including a chart and an indicator co-operating therewith, there being a narrow aperture in spacial relation with an indicium on the chart of said controlling mechanism, a light source mounted to emit light through said aperture, a light sensitive element mounted to receive such light so emitted through said aperture, an electric circuit controlled by said light sensitive element, means adapted to cover said aperture and thereby cut off emission of light from said light source therethrough, and means for causing said cover means and said indicators to move simultaneously.

MARK A. WECKERLY.